Figure 1:
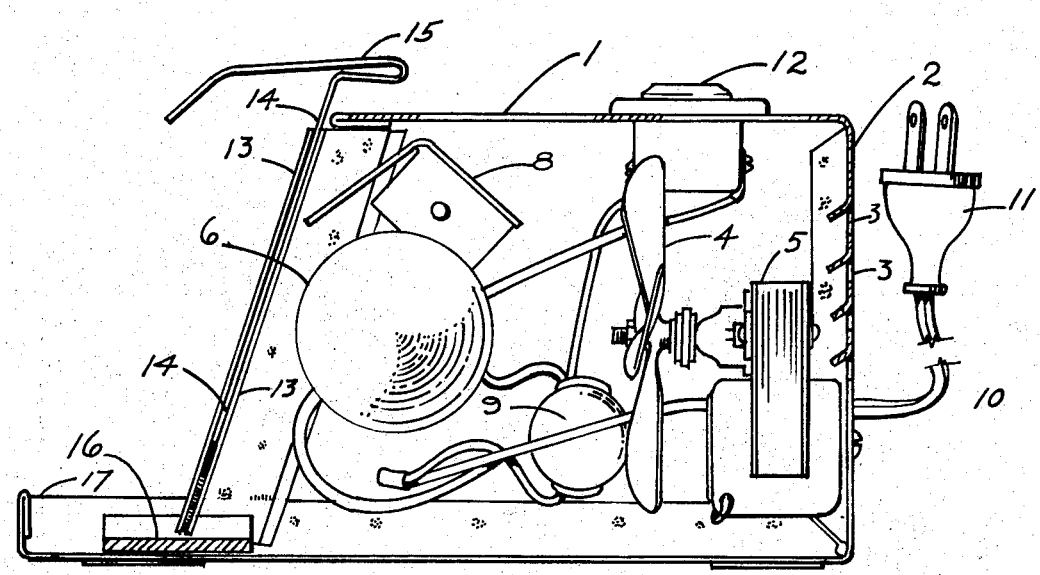

United States Patent

Drury

[15] 3,701,201
[45] Oct. 31, 1972

[54] MICROSCOPE SLIDE DRYER

[72] Inventor: James A. Drury, 1951 Benson Highway, Tucson, Ariz. 85714

[22] Filed: Feb. 10, 1971

[21] Appl. No.: 114,227

[52] U.S. Cl. ..........................34/60, 34/202, 34/218, 34/239
[51] Int. Cl. ..............................................F26b 19/00
[58] Field of Search..........34/60, 150, 218, 202, 231, 34/237, 238, 239; 206/62; 211/40, 41

[56] References Cited

UNITED STATES PATENTS

| | | | |
|---|---|---|---|
| 3,258,853 | 7/1966 | Bradbury | 34/202 |
| 1,809,781 | 6/1931 | Gross | 211/40 UX |
| 2,623,301 | 12/1952 | Weiskopf | 34/202 X |
| 2,671,280 | 3/1954 | Grieve et al. | 34/231 |

Primary Examiner—Frederick L. Matteson
Assistant Examiner—Harry B. Ramey
Attorney—Pike H. Sullivan

[57] ABSTRACT

The dryer of the present invention comprises a substantially rectangular housing open at its front end and its rear wall is provided with one or more openings for the ingress of air. The front end is adapted to receive and hold in locked position a microscope slide tray, the locking being provided by a pair of slidably mounted legs carried by the front ends of the housing side walls. The upper ends of the legs are attached to a transverse shield. An electric fan is mounted in the rear portion of the housing and an electric light bulb, or other suitable heat source, is mounted in the upper portion of the front portion of the housing. A transverse heat and air baffle or shield is mounted intermediate the bulb and top of the housing.

6 Claims, 2 Drawing Figures

3,701,201

JAMES A. DRURY-INVENTOR
BY Pike H. Sullivan

MICROSCOPE SLIDE DRYER

The present invention relates to dryers for microscope slides of the type used by pathologists and others of the medical profession for examining histological tissue specimens.

These specimens are ordinarily carried or floated on water and the glass slide immersed in the water and moved under the specimen, then lifted, thereby placing the specimen on the slide. In order to permit satisfactory microscopic examination of the specimen it is necessary that the water be removed from the slide and the specimen.

It is an object of the present invention to provide a device for removing all such water by subjecting the slide to proper conditions for expediting the evaporation of such water thereby minimizing the time before the slide is ready to be placed in the microscope.

A further object is to provide a microscope slide drying device which will effectively dry the slides but which will not damage the specimens thereon in event the slide is permitted to remain in the dryer for a substantial period of time after it has become dried.

Another object is to produce a device which is simple to operate and which is readily adaptable to drying a large number of slides simultaneously.

The above and other objects, features, and advantages of this invention will be fully understood from the following description considered in connection with the accompanying illustrative drawings.

Figure 2:
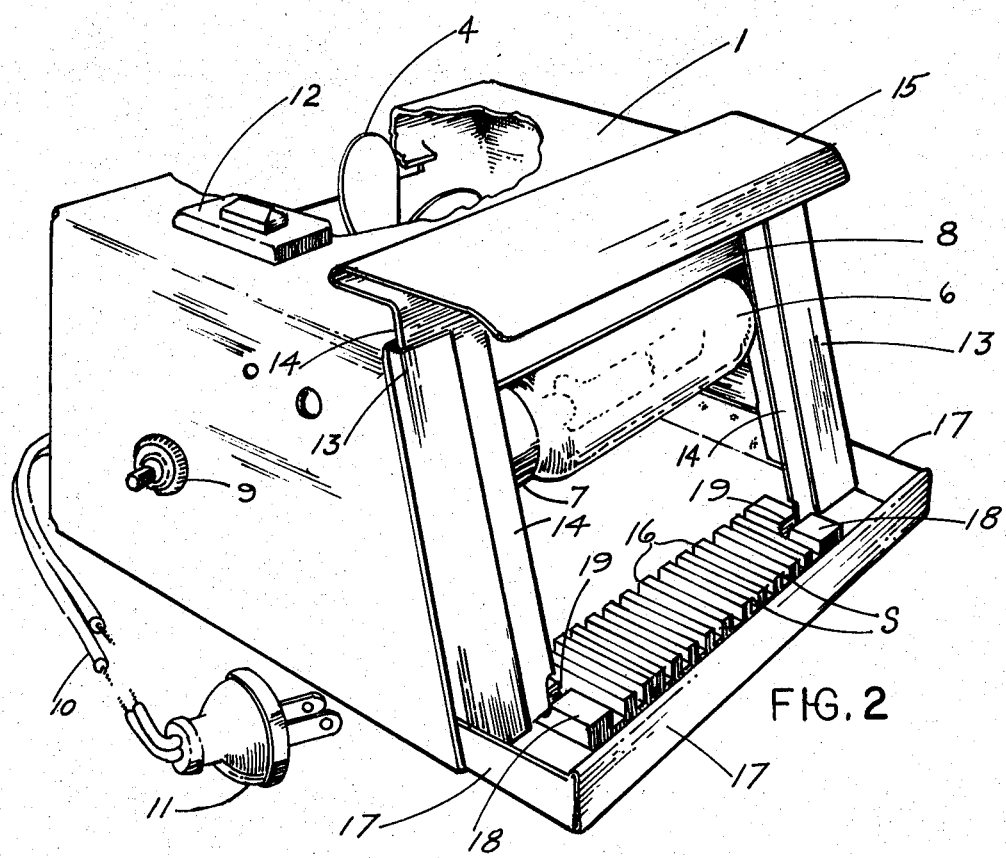

In the drawings:

FIG. 1 is a longitudinal sectional view of a slide dryer embodying the present invention; and FIG. 2 is an isometric view of such dryer.

Referring more specifically to the drawings, the slide dryer 1 embodying the present invention comprises a generally rectangular sheet metal housing which is open at its front end. The rear wall 2 is provided with louvered openings 3. A fan 4 driven by an electric motor 5 is mounted in the rear interior portion of the housing. A tubular type incandescent light bulb 6 is mounted in a horizontal position in the front portion of the housing intermediate the top and bottom walls of the housing. The bulb 6 is removably mounted in a conventional socket 7 secured to a side wall of the housing. A horizontally disposed angular heat and light reflecting shield 8 is mounted above the bulb 6 in parallel spaced relationship thereto. This shield 8 also functions to direct air over the bulb 6 and downwardly toward the slideholder 16.

A switch 9 is mounted in the lower portion of a side wall of the housing. Electrical energy is supplied to the dryer by means of a lead wire 10 provided with a conventional plug 11 for connection to a source of electricity. Ordinarily it is preferred to employ 60 cycle A.C. current within the voltage range of 110–120 volts. The interior of the housing is provided with a suitable system of wiring whereby the switch 9 simultaneously controls all electrical energy flowing to the fan motor 5, the tubular bulb 6 and the indicator light 12 which is mounted on the top wall of the dryer housing.

It will be noted that the front of the dryer housing is unenclosed and the front ends of the side walls are angular so as to provide a rearward slope. The front end of each side wall carries a U-shaped member 13 which provide slots for receiving in slidable engagement each one of a pair of legs 14 which depend from a horizontal shield 15.

A slide tray 16 is provided with a plurality of transverse slots S, which receive and carry the slides. The tray 16 is adapted to be placed at the lower front end of the dryer housing. The bottom wall of the housing extends beyond the bottom ends of the side walls and is provided at its end and sides with short vertical walls 17 which serve to enclose the slide tray 16 and retain any liquid which might drain from the slides. Each end 18 of the slide tray is provided with a notch 19 which engages the notched ends of the legs 14 of the shield 15 when in their full downwardly extended position, whereby the slide tray is locked in position (FIG. 2). The slide tray 16 may be of rust resistant metal, such as aluminum, or be molded from a suitable plastic material, such as polypropylene, high impact polystyrene, etc.

In operation, the slides to be dried (not shown) are placed in the slots S of the tray 16. Ordinarily, these are of rectangular configuration and fit rather snugly in the slots S. If desired, the slide tray 16 may be removed from the dryer by raising the shield 15 so that the legs 14 are removed from engagement with the tray S. The slides may then be mounted on the tray 16 and the same then placed in the dryer and locked into position, as shown (FIG. 2) by pushing down the shield 15 so as to cause the lower notched portion of legs 14 to engage the notches 19 in the slide ends 18. The plug 11 being connected to an electricity source, the switch is turned on with the result the bulb 6 is lit, the fan 4 turns and the indicator light 12 glows red. The fan 4 draws air through the louvered openings 3 in the rear wall and causes the same to flow over and under the bulb 6, whereby it absorbs heat therefrom. The warmed air then flows past the slides in tray 16 which also receive radiant heat from the incandescent bulb 6, with the result the slides are rapidly dried but are not exposed to an undesirably elevated temperature level. The dried slides may be removed from the tray 6 while it is in locked position in the fore part of the dryer, or, if desired, the legs 14 may be raised and the slide tray removed with the dried slides thereon.

Any liquid which might drain from the slides will be trapped in the bottom of the dryer and retained by the walls 17.

It will be understood that the invention may be embodied otherwise than as hereinabove specifically illustrated or described, and that various changes in the details of construction and in the form and arrangement of parts of the illustrated embodiment may be made without departing from the underlying idea or principles of this invention within the scope of the appended claims.

I claim:

1. A dryer for microscopic slides comprising a substantially rectangular shaped housing open at the front end thereof and enclosed by the other walls thereof, a fan means within the rear portion of said housing for causing air to flow outwardly through the open front end thereof, electrical resistance heating means within the front portion of said housing and positioned intermediate the top and bottom walls of the housing and so as to be in the air stream produced by said fan means, a slide receptacle positioned below and outwardly of said heating means so as to receive radiant heat from said heating means and be contacted by air heated by said heating means, and a pair of legs slidably mounted on the front end of said housing and adapted, when in downwardly extended position, to secure said slide receptacle in desired position below and outwardly of said heating means.

2. The invention of claim 1 wherein the upper ends of said slidable legs are attached to a transverse and horizontally disposed shield which, upon the said legs being extended downwardly so as to engage said slide tray functions as a forward extension of the top wall of said housing.

3. The invention of claim 2 wherein a shield is transversely mounted intermediate said heating means and the top wall of said housing so as to function as a heat shield for said top wall and direct air over said heating element.

4. The invention of claim 3 wherein the rear wall of said housing is perforated to provide for entry of air thereinto.

5. The invention of claim 4 wherein each end of said slide receptacle is provided with a notch which is engaged by the lower end of each of said slidable legs.

6. The invention of claim 5 wherein the front portion of the bottom wall of said housing is provided with raised edges which prevent the escape from the dryer of any liquid which may drip from the slides.

* * * * *